United States Patent
Witherspoon et al.

(10) Patent No.: US 9,049,170 B2
(45) Date of Patent: Jun. 2, 2015

(54) BUILDING FILTER THROUGH UTILIZATION OF AUTOMATED GENERATION OF REGULAR EXPRESSION

(71) Applicant: Arbor Networks, Inc., Burlington, MA (US)

(72) Inventors: Bryan Andrew Witherspoon, Jackson, MI (US); Joshua Matthew Fields, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 43 days.

(21) Appl. No.: 13/907,429

(22) Filed: May 31, 2013

(65) Prior Publication Data

US 2014/0331321 A1 Nov. 6, 2014

Related U.S. Application Data

(60) Provisional application No. 61/818,230, filed on May 1, 2013.

(51) Int. Cl.
*H04L 29/00* (2006.01)
*H04L 29/06* (2006.01)

(52) U.S. Cl.
CPC .................... *H04L 63/0227* (2013.01)

(58) Field of Classification Search
CPC ........................................ H04L 12/26
USPC ............................................... 726/23
See application file for complete search history.

(56) References Cited

U.S. PATENT DOCUMENTS 7,463,590 B2 * 12/2008 Mualem et al. ............... 370/241

* cited by examiner

*Primary Examiner* — Brandon Hoffman
*Assistant Examiner* — Michael D Anderson
(74) *Attorney, Agent, or Firm* — Locke Lord LLP; Scott D. Wofsy; Chistopher J. Capelli

(57) ABSTRACT

A system and method performed by a computing device connected to a network and having one or more processors and memory storing one or more programs for execution by the one or more processors. At least one packet is received over a network. The packet is analyzed to detect predetermined content. The predetermined content is selected if it is determined that the packet contains the predetermined content. Future transmission of any packet containing the predetermined content is prevented in response to selection of the predetermined content.

14 Claims, 3 Drawing Sheets

BUILDING FILTER THROUGH UTILIZATION OF AUTOMATED GENERATION OF REGULAR EXPRESSION

FIELD OF THE INVENTION

The present invention relates to communication networks, and more specifically, to techniques for filtering traffic from a malicious source.

BACKGROUND OF THE INVENTION

With advances in integrated circuit, microprocessor, networking and communication technologies, increasing numbers of devices, in particular, digital computing devices, are being networked together. Devices are often first coupled to a local area network, such as an Ethernet based office/home network. In turn, local area networks are interconnected together through wide area networks, such as ATM networks, Frame Relays, and the like. Of particular interest is the TCP/IP based global inter-networks—the Internet.

To ensure successful communication over the Internet, it is important to prevent undesirable network traffic. For example, the use of denial of service (DoS) attacks has grown over the years to prevent legitimate traffic from reaching its intended destination. Accordingly, the utilization of effective preventative measures has become increasingly important.

One preventive measure is the use of a monitoring device to inspect network traffic before it reaches an intended destination. If it appears that the content has originated from a malicious source, then the traffic can be prevented from reaching the intended destination. Inspecting network traffic, however, can be a time intensive process. Often this process involves an administrator manually capturing packets and then reviewing the packets to identify content from a malicious source. The administrator then has to engage in a time consuming process of adding a filter to the monitoring device to prevent future packets originating from the malicious source from being transmitted to the destination. According, what are needed are systems and methods to optimize the process of adding filters to monitoring devices.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

A system and method performed by a computing device connected to a network and having one or more processors and memory storing one or more programs for execution by the one or more processors. At least one packet is received over a network. The packet is analyzed to detect predetermined content. The predetermined content is selected if it is determined that the packet contains the predetermined content. Future transmission of any packet containing the predetermined content is prevented in response to selection of the predetermined content.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
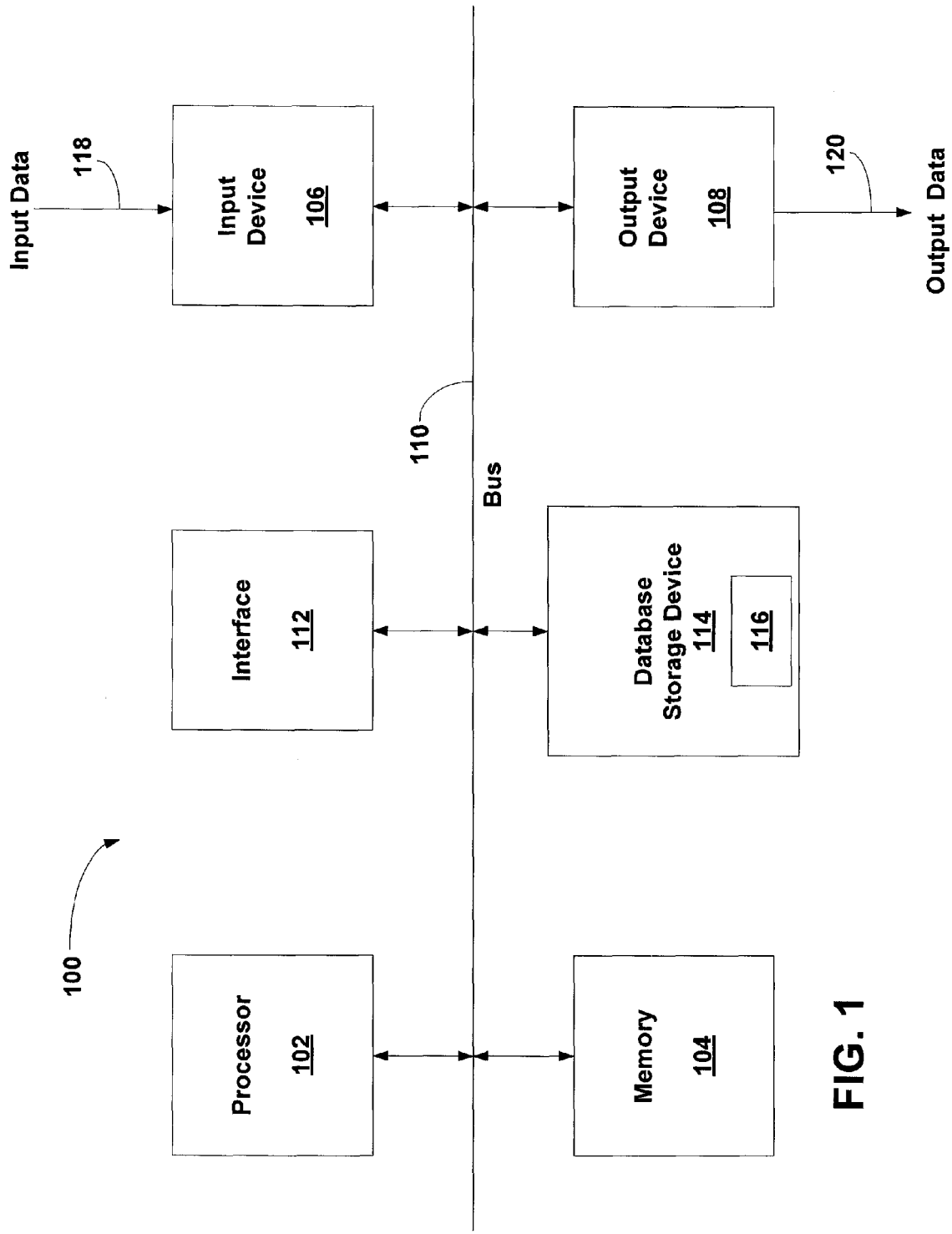
FIG. 1 illustrates a system overview of a computer system utilized in the certain illustrated embodiments.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary general-purpose computing system in which illustrated embodiments of the present invention may be implemented. A generalized computing embodiment in which the present invention can be realized is depicted in FIG. 1 illustrating a processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
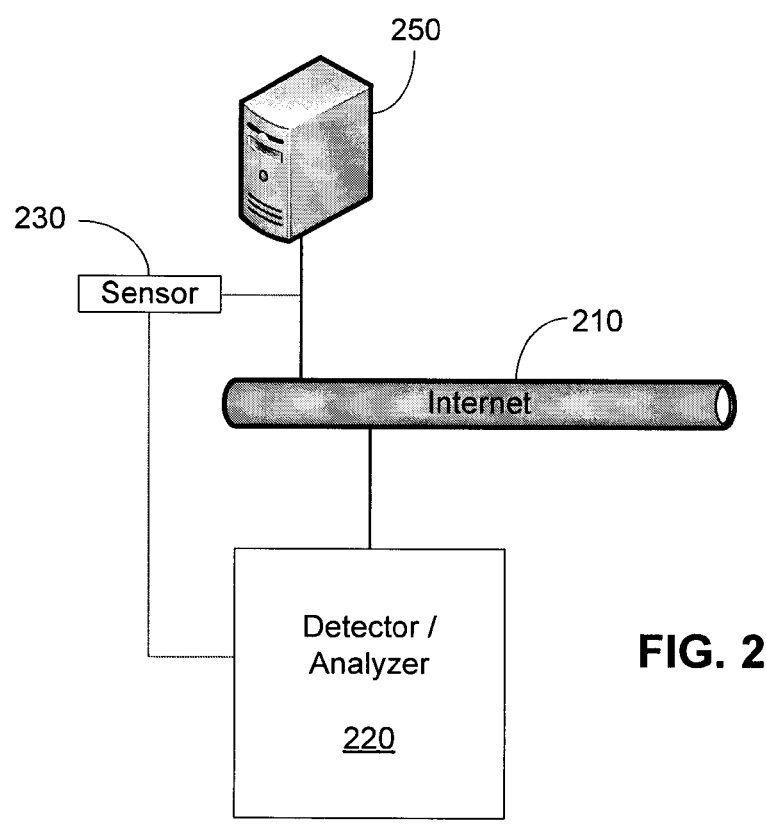
FIG. 2 illustrates a network view of a certain illustrated embodiment.

With the exemplary computing system environment 100 of FIG. 1 being generally shown and discussed above, depicted in FIG. 2 is a generalized diagram of a system (referenced generally by numeral 200) for performing the below illustrated techniques of the present invention, which may be utilized with system 100, or components thereof. It is to be understood the present invention is not be limited to what is shown in FIG. 2, as it is to be utilized in any system, apparatus and/or device coupled to a network for receiving samples of web traffic to preferably identify possible blocks of source IP addresses associated with malicious entities and to filter additional blocks sent from such source IP addresses.

For instance, an illustrated use of the illustrated system and process described herein is with the PRAVAIL™ Availability Protection System (PRAVAIL™ APS) from Arbor® Networks. PRAVAIL™ APS is a network security product configured and adapted for generally preventing DDoS attacks and availability threats that affect data centers and enterprise networks. PRAVAIL™ APS may be deployed by network/data center operators in front of services to stop application-layer attacks. PRAVAIL™ APS may further be integrated upstream in a network/data center to preferably thwart volumetric DDoS attacks. Features of PRAVAIL™ APS include (but are not limited to): detecting and blocking emerging application-layer DDoS attacks; and deploy a turnkey solution to thwart DDoS threats; accelerate responses to DDoS attacks to prevent disruption of legitimate services.

System 200 generally includes an analyzing apparatus 220 coupled to one or more sensor devices 230 coupled to the Internet 210. It is to be understood and appreciated the analyzing apparatus 220 and each of the one or more sensor devices 230 includes the above described system 100, or components therefore, to perform the below described functionality in accordance with an illustrated embodiment for detecting malicious sources of IP blocks. It is to be further understood and appreciated analyzing apparatus 220 and a sensor device 230 may be separate components (as illustrated) or may be integrated in one single component. Preferably, each sensor 230 is a passive device for acquiring samples of IP traffic (e.g., IP traffic to a node, such as webserver 250) for input into analyzing apparatus 220 for performance of an illustrated embodiment as discussed in conjunction with FIG. 3 below.

Figure 3:
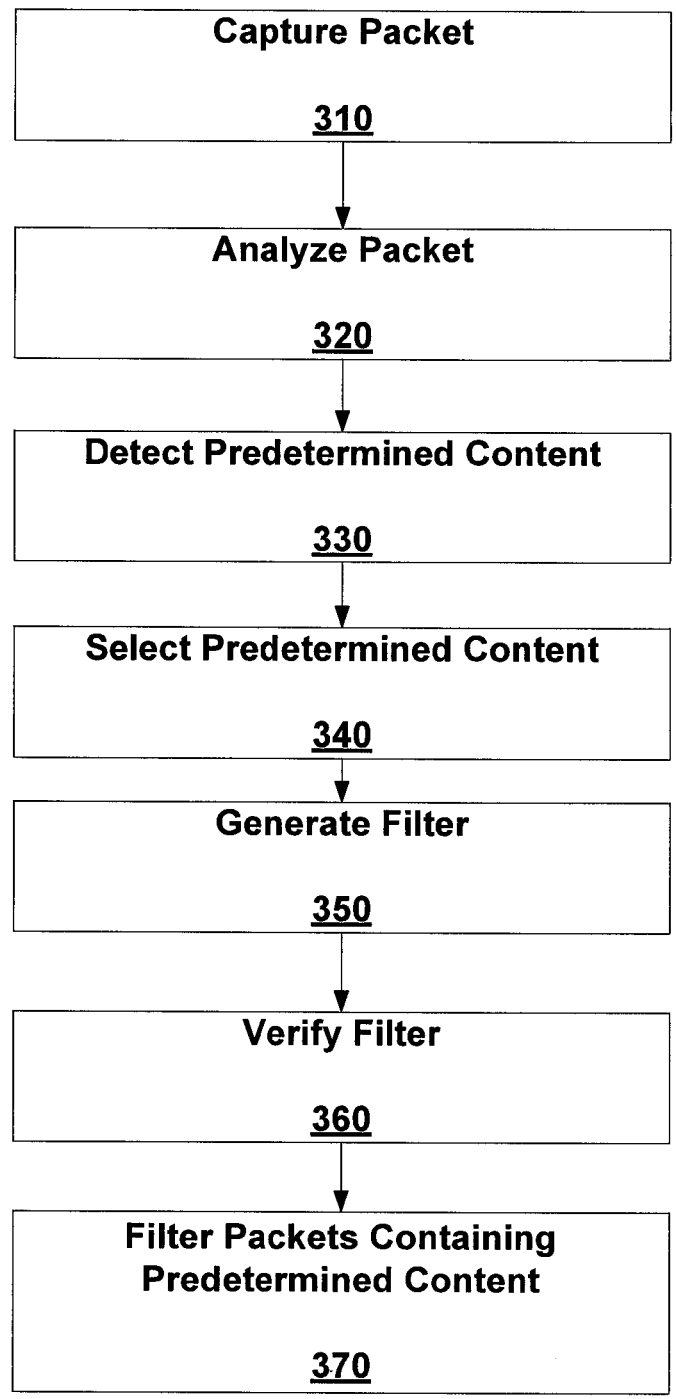
FIG. 3 depicts a method utilized with the illustrated embodiment of FIG. 2.

With reference now to FIG. 3, shown is a flow chart demonstrating implementation of the various exemplary embodiments of the present invention technique for detecting malicious sources through analysis of response traffic. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

Starting at step 310, the preferably one or more internet sensors 230 capture at least one packet sample from the Internet 210 that is intended for webserver 250.

Next, analyzing apparatus 220 analyzes the contents of the packet in step 320. In another example, analyzing apparatus 220 outputs the packet contents to an output device at which the packet contents are viewed by a system user. In one embodiment, the packet contents are displayed in hexadecimal and/or binary format.

In step 330, analyzing apparatus 220 detects that the packet contains predetermined content. In one example, the predetermined content indicates that the packet originates from a malicious source. For instance, analyzing apparatus 220 may determine that the packet originates from a malicious source due to the originating there being characters identifying a known malicious user agent, IP address, or uniform resource locator (url) of a known malicious source. In another example, analyzing apparatus 220 may determine that the packet originates from a likely malicious source. For instance, analyzing apparatus 220 may determine that the source is unknown and therefore not have enough confidence in the source to forward the packet or future packets to web server 250. In another example, a user may make a manual determination that the packet originates from a malicious or likely malicious source.

In another example, analyzing apparatus 220 may attempt to authenticate source of the packet and if the source can be authenticated, then forward the packet to web server 250, and if the packet cannot be authenticated, then determine that the packet originates from a likely malicious source. For example, one way to authenticate the packet would be to authenticate the detected source IP address via a probability estimation regarding its association with a known legitimate source, such as a web crawler. For instance, the probability estimation, includes (and is not to be understood to be limited thereto) if greater than 20% of a particular CIDR block's observed HTTP requests (that claim to be a particular web crawler) are successfully authenticated via round-trip DNS lookups, and at least 60% of that CIDR block's constituent IP addresses have been associated with at least one observed HTTP request claiming to be that particular web crawler, and the CIDR block is of size/24 or larger, then that CIDR block is assigned a high probability of being a source used by the particular legitimate web crawler.

If is determined that the packet originates from a malicious source, then in step 340, analyzing apparatus 220 selects the content within the packet that identifies the originating source. For instance, analyzing apparatus 220 may select all or a portion of the hexadecimal and/or binary code representing the characters identifying a malicious user agent, malicious IP address, or uniform resource locator (url) of a known malicious source. In another example, a user may select the select all or a portion of the above hexadecimal and/or binary representation of the source IP address through utilization of an input/output device, such as a computer mouse or a stylus device. In a further example, the user may select the hexadecimal and/or binary representation of the source IP address, copy the representation, and paste it into a user interface of a filter generator of analyzing apparatus. The user then may instruct the analyzing apparatus 220 to build a filter by pressing an actuating key on a user interface.

In step 350, in response to selection of the content, analyzing apparatus 220 generates a filter. In one example, the filter serves to filter packets that contain the slected content. In one embodiment, the filter is generated by analyzing the selected content. Bytes that fall within the ASCII table are converted to a regular expression. Bytes that are not within the ASCII table are removed, omitted, or escaped from the regular expression. Any bytes that are identified as PCRE meta characters are also removed, omitted, or escaped from the regular expression.

In step 360, analyzing apparatus 220 verifies that it would like to filter future packets containing the content. For instance, the analyzing apparatus may utilize rules regarding proper syntax of filters to verify that the regular expression is correct. In another example, a user may view the regular expression to determine that is correct and actuate an interface for analyzing apparatus 220 to build the filter. If the analyzing apparatus 220 and/or user determine to continue, then analyzing apparatus 220, in step 370 filters future packets containing the content.

With the certain illustrated embodiments described above, it is to be understood optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the illustrated embodiments and of the manner and process of making and using them in such full, clear, concise, and exact terms as to enable any person skilled in the art to which it pertains to make and use these devices and methods. The illustrated embodiments are, however, susceptible to modifications and alternative method steps from those discussed above that are fully equivalent. Consequently, the above described illustrated embodiments are not limited to the particular embodiments disclosed. On the contrary, they may encompass all modifications and alternative constructions and methods coming within the spirit and scope of the invention.

What is claimed is:

1. A method performed by a computing device connected to a network and having one or more processors and memory storing one or more programs for execution by the one or more processors, comprising:
    receiving at least one packet sent over a network;
    analyzing the packet to detect predetermined content, wherein the step of analyzing comprises displaying packet content on an output device;
    selecting the predetermined content if it is determined that the packet contains the predetermined content, wherein the step of selecting comprises receiving user input identifying the predetermined content and adding a regular expression representing the predetermined content into a user interface of a filter that prevents transmission of packets containing the predetermined content; and
    preventing future transmission of any packet containing the predetermined content by using the filter in response to selection of the predetermined content.

2. The method of claim 1, wherein the step of analyzing further comprises:
    reviewing the packet contents to determine if the packet originated from a malicious source.

3. The method of claim 2, wherein the step of reviewing comprises:
    identifying characters within the packet content that are indicative of the packet originating from a predetermined source.

4. The method of claim 3, wherein the characters identify at least one of a user agent and a uniform resource locator (url).

5. The method of claim 1, wherein the step of displaying comprises:
    displaying the packet contents in at least one of binary and hexadecimal notation.

6. The method of claim 1, wherein the user input comprises highlighted predetermined content.

7. The method of claim 6, wherein the step of adding a regular expression comprises:
    copying the highlighted predetermined content; and
    pasting the regular expression representing the predetermined content into the user interface of the filter.

8. The method of claim 1, further comprising:
    removing wildcard characters from the predetermined content prior to pasting the representation of the predetermined content into the user interface.

9. A system for detecting malicious transmissions sent to a node:
    a memory;
    a processor disposed in communication with said memory, and configured to issue a plurality of instructions stored in the memory, wherein the instructions issue signals to:
        receive at least one packet sent over a network;
        cause an output device to display packet content;
        analyze the packet to detect predetermined content;
        receive user input identifying the predetermined content if it is determined that the packet contains the predetermined content;
        add a regular expression representing the predetermined content into a user interface of a filter that prevents transmission of packets containing the predetermined content based on the user input; and
        prevent future transmission of packets containing the predetermined content by using the filter in response to selection of the predetermined content.

10. The system as recited in claim 9, wherein the processor is configured to review the packet content to determine if the packet originated from a suspicious source.

11. The system as recited in claim 10, wherein the processor is configured to identify characters within the packet content that are indicative of the packet originating from a predetermined source.

12. The system as recited in claim 11, wherein the characters identify at least one of a user agent and a uniform resource locator (url).

13. The system as recited in claim 9, wherein the processor is configured to cause the packet content to be displayed in at least one of binary and hexadecimal notation.

14. The system as recited in claim 9, wherein the processor is further configured to:
    remove wildcard characters from the predetermined content prior to adding the regular expression to the filter.

* * * * *